US010248334B2

(12) United States Patent
Oshins et al.

(10) Patent No.: US 10,248,334 B2
(45) Date of Patent: *Apr. 2, 2019

(54) VIRTUAL STORAGE TARGET OFFLOAD TECHNIQUES

(71) Applicant: Microsoft Technology Licensing, LLC, Redmond, WA (US)

(72) Inventors: Jacob Oshins, Seattle, WA (US); Dustin L. Green, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 349 days.

This patent is subject to a terminal disclaimer.

(21) Appl. No.: 15/177,142

(22) Filed: Jun. 8, 2016

(65) Prior Publication Data

US 2017/0017422 A1    Jan. 19, 2017

Related U.S. Application Data

(63) Continuation of application No. 12/640,272, filed on Dec. 17, 2009, now Pat. No. 9,389,895.

(51) Int. Cl.
| | |
|---|---|
| *G06F 3/06* | (2006.01) |
| *G06F 9/455* | (2018.01) |
| *G06F 9/50* | (2006.01) |
| *H04L 29/08* | (2006.01) |

(52) U.S. Cl.
CPC .......... *G06F 3/0619* (2013.01); *G06F 3/0647* (2013.01); *G06F 3/0665* (2013.01); *G06F 3/0689* (2013.01); *G06F 9/45537* (2013.01); *G06F 9/45558* (2013.01); *G06F 9/5077* (2013.01); *G06F 9/45533* (2013.01); *G06F 2009/45579* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 5,239,647 | A | 8/1993 | Anglin et al. |
| 6,349,337 | B1 | 2/2002 | Parsons, Jr. et al. |
| 6,360,281 | B1 | 3/2002 | Feagans |
| 6,922,724 | B1 | 7/2005 | Freeman et al. |

(Continued)

FOREIGN PATENT DOCUMENTS

| | | |
|---|---|---|
| CN | 101385009 A | 3/2009 |
| CN | 101398770 A | 4/2009 |

(Continued)

OTHER PUBLICATIONS

U.S. Appl. No. 12/640,318; Non-Final Office Action; dated Jun. 20, 2017; 15 pages.

(Continued)

*Primary Examiner* — Backhean Tiv
(74) *Attorney, Agent, or Firm* — Baker & Hostetler LLP

(57) ABSTRACT

A virtual machine storage service can be use a unique network identifier and a SR-IOV compliant device can be used to transport I/O between a virtual machine and the virtual machine storage service. The virtual machine storage service can be offloaded to a child partition or migrated to another physical machine along with the unique network identifier.

19 Claims, 13 Drawing Sheets

(56) References Cited

U.S. PATENT DOCUMENTS

| | | | |
|---|---|---|---|
| 7,010,607 B1* | 3/2006 | Bunton | H04L 1/18 709/228 |
| 7,124,320 B1* | 10/2006 | Wipfel | G06F 11/203 714/13 |
| 7,127,445 B2 | 10/2006 | Mogi et al. | |
| 7,281,108 B2 | 10/2007 | Todd | |
| 7,299,337 B2 | 11/2007 | Traut et al. | |
| 7,308,551 B2 | 12/2007 | Arndt et al. | |
| 7,313,637 B2* | 12/2007 | Tanaka | G06F 9/5077 710/15 |
| 7,379,990 B2 | 5/2008 | Tsao | |
| 7,437,730 B2* | 10/2008 | Goyal | G06F 9/5083 709/201 |
| 7,523,286 B2 | 4/2009 | Ramany et al. | |
| 7,525,957 B2 | 4/2009 | Scherer et al. | |
| 7,689,800 B2 | 3/2010 | Oshins et al. | |
| 7,689,862 B1* | 3/2010 | Bharthulwar | G06F 11/2046 714/13 |
| 7,836,332 B2* | 11/2010 | Hara | G06F 3/0607 714/5.11 |
| 8,046,458 B2 | 10/2011 | Rosenbach et al. | |
| 8,054,763 B2* | 11/2011 | Mehrotra | H04L 67/1097 370/254 |
| 8,078,690 B2* | 12/2011 | Shimozono | G06F 17/30067 370/401 |
| 8,117,487 B1* | 2/2012 | Raut | G06F 11/004 709/224 |
| 8,156,253 B2* | 4/2012 | Watanabe | G06F 9/45558 710/8 |
| 8,327,086 B2 | 12/2012 | Jacobs et al. | |
| 8,386,540 B1* | 2/2013 | McAlister | G06F 17/30566 707/771 |
| 8,392,482 B1* | 3/2013 | McAlister | G06F 17/30584 707/899 |
| 8,473,566 B1* | 6/2013 | Cardente | G06F 3/061 370/252 |
| 8,489,721 B1* | 7/2013 | Gokhale | H04L 29/14 709/208 |
| 9,389,895 B2* | 7/2016 | Oshins | G06F 9/45537 |
| 9,740,517 B2* | 8/2017 | Shedel | G06F 9/45558 |
| 2002/0188711 A1* | 12/2002 | Meyer | G06F 3/0605 709/223 |
| 2003/0115324 A1* | 6/2003 | Blumenau | G06F 9/468 709/225 |
| 2003/0126518 A1 | 7/2003 | Binger | |
| 2003/0182427 A1* | 9/2003 | Halpern | G06F 9/4843 709/226 |
| 2003/0187853 A1* | 10/2003 | Hensley | G06Q 10/10 |
| 2003/0233494 A1 | 12/2003 | Ghosh et al. | |
| 2004/0151188 A1* | 8/2004 | Maveli | H04L 12/4641 370/398 |
| 2004/0221049 A1* | 11/2004 | Blumenau | H04L 29/06 709/229 |
| 2005/0033888 A1* | 2/2005 | Qi | G06F 3/0607 710/200 |
| 2005/0080982 A1 | 4/2005 | Vasilevsky et al. | |
| 2005/0108712 A1 | 5/2005 | Goyal | |
| 2005/0198303 A1 | 9/2005 | Knauerhase et al. | |
| 2006/0059308 A1* | 3/2006 | Uratani | G06F 3/0607 711/114 |
| 2006/0085530 A1* | 4/2006 | Garrett | G06F 11/3495 709/223 |
| 2006/0085668 A1* | 4/2006 | Garrett | G06F 9/5061 714/4.1 |
| 2006/0112247 A1 | 5/2006 | Ramany et al. | |
| 2006/0248292 A1* | 11/2006 | Suresh | G06F 3/061 711/154 |
| 2007/0006218 A1 | 1/2007 | Vinberg | |
| 2007/0050764 A1* | 3/2007 | Traut | G06F 9/45558 718/1 |
| 2007/0162572 A1* | 7/2007 | Aloni | G06F 9/5077 709/219 |
| 2007/0168525 A1 | 7/2007 | DeLeon, III et al. | |
| 2007/0174850 A1* | 7/2007 | El Zur | G06F 13/385 719/321 |
| 2007/0239944 A1* | 10/2007 | Rupanagunta | G06F 3/0613 711/147 |
| 2007/0260702 A1 | 11/2007 | Richardson et al. | |
| 2008/0082975 A1* | 4/2008 | Oney | G06F 9/45558 718/1 |
| 2008/0091837 A1* | 4/2008 | Langen | H04L 65/40 709/230 |
| 2008/0098392 A1 | 4/2008 | Wipfel et al. | |
| 2008/0104338 A1 | 5/2008 | Kinoshita et al. | |
| 2008/0140866 A1* | 6/2008 | Corry | G06F 3/0605 710/8 |
| 2008/0155243 A1* | 6/2008 | Diep | G06F 9/45558 713/2 |
| 2008/0183991 A1* | 7/2008 | Cosmadopoulos | G06F 11/2097 711/162 |
| 2008/0186990 A1 | 8/2008 | Abali et al. | |
| 2008/0201455 A1 | 8/2008 | Husain | |
| 2008/0222375 A1* | 9/2008 | Kotsovinos | G06F 9/5083 711/162 |
| 2008/0240434 A1* | 10/2008 | Kitamura | G06F 21/80 380/255 |
| 2008/0263553 A1* | 10/2008 | Lueck | G06F 9/505 718/102 |
| 2009/0006537 A1 | 1/2009 | Palekar et al. | |
| 2009/0025007 A1 | 1/2009 | Hara et al. | |
| 2009/0037680 A1 | 2/2009 | Colbert et al. | |
| 2009/0037941 A1 | 2/2009 | Armstrong et al. | |
| 2009/0089498 A1 | 4/2009 | Hay | |
| 2009/0094603 A1* | 4/2009 | Hiltgen | G06F 9/4406 718/1 |
| 2009/0133028 A1 | 5/2009 | Brown et al. | |
| 2009/0164536 A1* | 6/2009 | Nasre | G06F 3/0611 |
| 2009/0187721 A1 | 7/2009 | Ueoka et al. | |
| 2009/0248869 A1 | 10/2009 | Ghostine | |
| 2009/0265708 A1 | 10/2009 | Nakajima | |
| 2009/0313445 A1 | 12/2009 | Pandey et al. | |
| 2009/0327576 A1* | 12/2009 | Oshins | G06F 9/45533 711/6 |
| 2009/0328074 A1* | 12/2009 | Oshins | G06F 9/45537 719/321 |
| 2010/0011368 A1* | 1/2010 | Arakawa | G06F 3/0604 718/104 |
| 2010/0042805 A1* | 2/2010 | Recio | G06F 3/0611 711/221 |
| 2010/0107159 A1* | 4/2010 | Radhakrishnan | G06F 9/5055 718/1 |
| 2010/0165877 A1 | 7/2010 | Shukla et al. | |
| 2010/0180274 A1* | 7/2010 | Cherian | G06F 9/45558 718/1 |
| 2010/0250868 A1* | 9/2010 | Oshins | G06F 12/0284 711/154 |
| 2010/0250869 A1* | 9/2010 | Adams | G06F 12/1063 711/154 |
| 2010/0287345 A1* | 11/2010 | Cherian | G06F 3/0604 711/162 |
| 2010/0318782 A1* | 12/2010 | Auradkar | G06F 11/1451 713/150 |
| 2011/0004680 A1 | 1/2011 | Ryman | |
| 2011/0019531 A1* | 1/2011 | Kim | G06F 11/203 370/216 |
| 2011/0023114 A1* | 1/2011 | Diab | G06F 9/4856 726/22 |
| 2011/0119481 A1* | 5/2011 | Auradkar | G06F 21/6209 713/150 |
| 2011/0119665 A1* | 5/2011 | Santos | G06F 9/45558 718/1 |
| 2011/0126207 A1* | 5/2011 | Wipfel | H04L 9/3213 718/104 |
| 2011/0145497 A1* | 6/2011 | Bish | H04L 67/1095 711/113 |
| 2011/0145816 A1* | 6/2011 | Glikson | G06F 9/45558 718/1 |

(56) References Cited

U.S. PATENT DOCUMENTS

| | | | |
|---|---|---|---|
| 2011/0153715 A1* | 6/2011 | Oshins | G06F 9/5088 709/203 |
| 2011/0153716 A1 | 6/2011 | Malakapalli et al. | |
| 2011/0154318 A1* | 6/2011 | Oshins | G06F 9/45537 718/1 |
| 2011/0213927 A1* | 9/2011 | Tucci | G06F 3/0604 711/114 |
| 2012/0278573 A1 | 11/2012 | Colbert et al. | |
| 2017/0017422 A1* | 1/2017 | Oshins | G06F 9/45537 |

FOREIGN PATENT DOCUMENTS

| | | |
|---|---|---|
| EP | 2017711 A2 | 1/2009 |
| JP | 2004-013454 A | 1/2004 |
| JP | 2007-102633 A | 4/2007 |
| JP | 2007-122432 A | 5/2007 |
| JP | 2007-328611 A | 12/2007 |
| JP | 2009-025381 A | 2/2009 |
| JP | 2009-026295 A | 2/2009 |
| JP | 2009-123217 A | 6/2009 |
| JP | 2009-259108 A | 11/2009 |
| JP | 2010-009396 A | 1/2010 |
| RU | 2006103559 A | 8/2007 |
| WO | WO 2009/025381 A1 | 2/2009 |
| WO | WO 2009/045884 A2 | 4/2009 |

OTHER PUBLICATIONS

"Office Action Issued in European Patent Application No. 10842429. 2", dated Oct. 23, 2017, 6 Pages.
International Application No. PCT/US2010/057871, Written Opinion of the International Searching Authority and Search Report, dated Jul. 29, 2011, 7 pages.
Fu, et al., "Service Migration in Distributed Virtual Machines for Adaptive Grid Computing," Wayne State University, downloaded from http://www.cs.nmt.edu/.about.song/Publications/servicemigration-icpp05.pd- f, 2005, 8 p.
Shimonski, "Using VMware: Understanding the virtual Switch," VirtualizationAdmin.com, downloaded from http://www.virtualizationadmin.com/articles-tutorials/vmware-esx-articles-/installation-deployment/vmware-understanding-virtual-switch.html, Sep. 3, 2008, 12 p.
Unknown, "Cisco Nexus 1000V Virtual Switch," Cisco, downloaded from http://www.unit4agresso.com/files/data.sub.--sheet.sub.--Nexus1000v.pdf, 2008, 7 p.
Unknown, "I/O Virtualization Switches Available From Start-Up VirtenSys," StorageNewsletter.com, downloaded from http://www.storagenewsletter.com/news/connection/virtensys-io-virtualizat- ion-switches-available-, Aug. 31, 2009, 6 p.
Haletky, "Balancing Virtual Machine Workloads to Improve Security and Performance," SearchServerVirtualization.com, downloaded at http://searchservervirtualization.techtarget.com/tip/0,289483,sid94.sub.--gci1346927,00.html, Feb. 26, 2009, 4 p.
"Oracle System Administration Guide: IP Services"; Chapter 1; Aug. 2011; p. 37-49.
"Using the Remote Desktop Virtualization API"; http://msdn.microsoft.com/en-us/library/ee351750(VS.82.printer).aspx; Microsoft Corporation; 2009 accessed Oct. 13, 2009; 1 page.
Andre Keartland; "Learning Lives Here—Windows 2008 R2—Remote Desktop Services: VDI—RD Connection Broker, RD Virtualization Host Drilldwon"; Microsoft tech-ed North America; 2009; 20 pages.
"VDI and Windows VISTA Enterprise Centralized Desktop Frequently Asked Questions"; FAQ; Microsoft; Dec. 17, 2008; 6 pages.
"Virtual Desktop Infrastructure (VDI) Overview"; http://www.msterminalservice.org/articles/Virtual-Desktop-Infrastructure-Overview.htm . . . ; TechGenix Ltd.; 2009; accessed Oct. 13, 2009; 5 pages.

* cited by examiner

US 10,248,334 B2

VIRTUAL STORAGE TARGET OFFLOAD TECHNIQUES

CROSS REFERENCE TO RELATED APPLICATION

This application is a Continuation of U.S. application Ser. No. 12/640,272 filed Dec. 17, 2009 which is related by subject matter to U.S. application Ser. No. 12/640,318 entitled "Lightweight Service Migration" filed on Dec. 17, 2009, the contents of which are herein incorporated by reference in their entirety.

BACKGROUND

Virtual machine technology can be used to package up a workload and move it in a datacenter. This ability to move a workload from one physical host to another is a tremendous benefit for users because it allows for dynamic machine consolidation which leads to much lower hardware and administrative costs. Virtual machines typically access storage through a module that handles storage virtualization located within a hypervisor, a management partition or a combination thereof. In this model virtual machines typically send storage I/O requests to the module via a software communication path such as an inter-partition communication bus like the example partition bus described in U.S. application Ser. No. 11/128,647 entitled "Partition Bus," the contents of which are herein incorporated by reference in their entirety. Communicating between the virtual machine and the hypervisor (or management partition) incurs a CPU cycle cost due to running the communication path and any context switches that may occur when transporting messages. Accordingly, techniques for increasing the efficiency of handling I/O requests by decreasing CPU costs are desirable.

SUMMARY

An example embodiment of the present disclosure describes a method. In this example, the method includes, but is not limited to effectuating a migratable storage service, wherein the migratable storage service is configured to manage virtual hard disk input/output requests for a child partition, wherein the migratable storage service is assigned a unique network identifier for a network; and configuring the migratable storage service as a storage target in a network. In addition to the foregoing, other aspects are described in the claims, drawings, and text forming a part of the present disclosure.

An example embodiment of the present disclosure describes a method. In this example, the method includes, but is not limited to attaching a first unique network identifier for a network adapter to a storage service configured to manage virtual hard drive disk input/output requests for a child partition; and attaching a virtual function effectuated by the network adapter to the child partition, wherein the virtual function includes a second unique identifier. In addition to the foregoing, other aspects are described in the claims, drawings, and text forming a part of the present disclosure.

An example embodiment of the present disclosure describes a method. In this example, the method includes, but is not limited to executing a storage service in a child partition, wherein the storage service is configured to manage virtual hard drive disk input/output requests for a second child partition, wherein the storage service is assigned a unique network identifier in a network. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
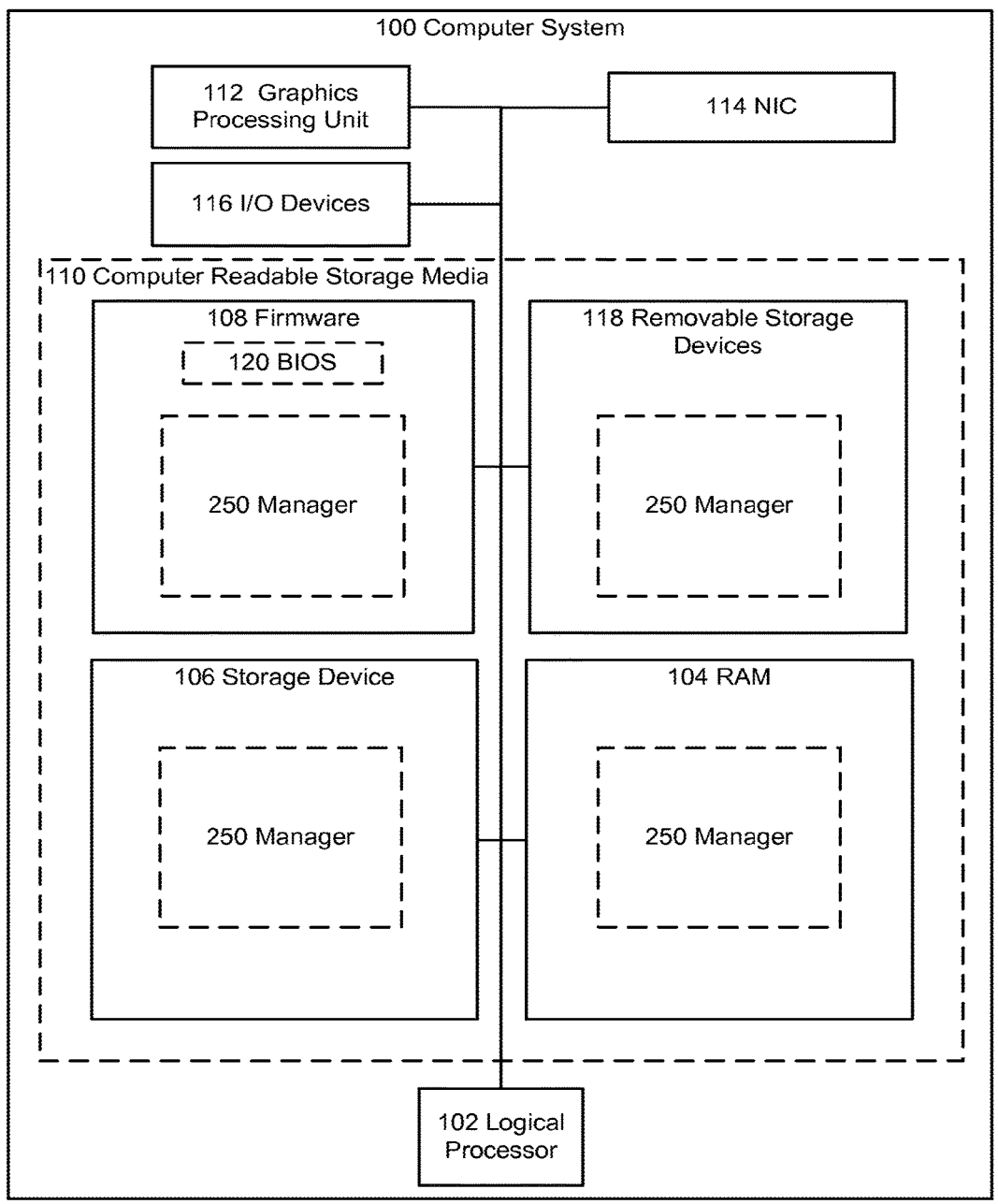
FIG. 1 depicts an example computer system wherein aspects of the present disclosure can be implemented.

Embodiments may execute on one or more computer systems. FIG. 1 and the following discussion are intended to provide a brief general description of a suitable computing environment in which the disclosure may be implemented.

The term circuitry used throughout the disclosure can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by firmware and/or software. Logical processor(s) can be configured by instructions embodying logic operable to perform function(s) that are loaded from memory, e.g., RAM, ROM, firmware, and/or mass storage. In an example embodiment where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include a logical processor 102, e.g., a hyperthread of an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges.

The computer readable storage media 110 can provide non volatile and volatile storage of processor executable instructions 122, data structures, program modules and other data for computer 100. A basic input/output system (BIOS) 120, containing the basic routines that help to transfer information between elements within the computer system 100 during start up can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices can be connected to the logical processor 102 through a serial port interface that is coupled to the system bus, and are often connected by other interfaces, such universal serial bus ports (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to remote computers. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the logical processor. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
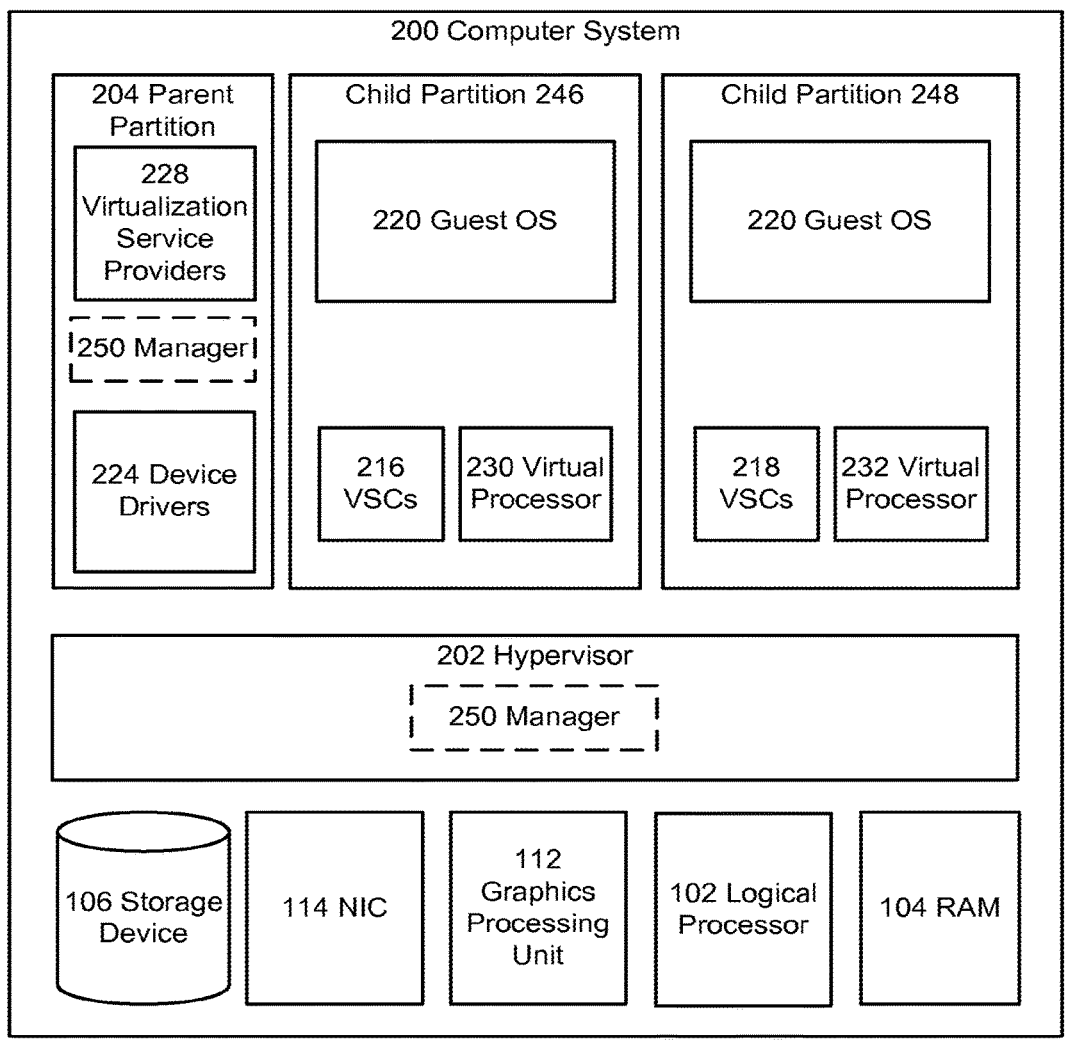
FIG. 2 depicts an operational environment for practicing aspects of the present disclosure.
Figure 3:
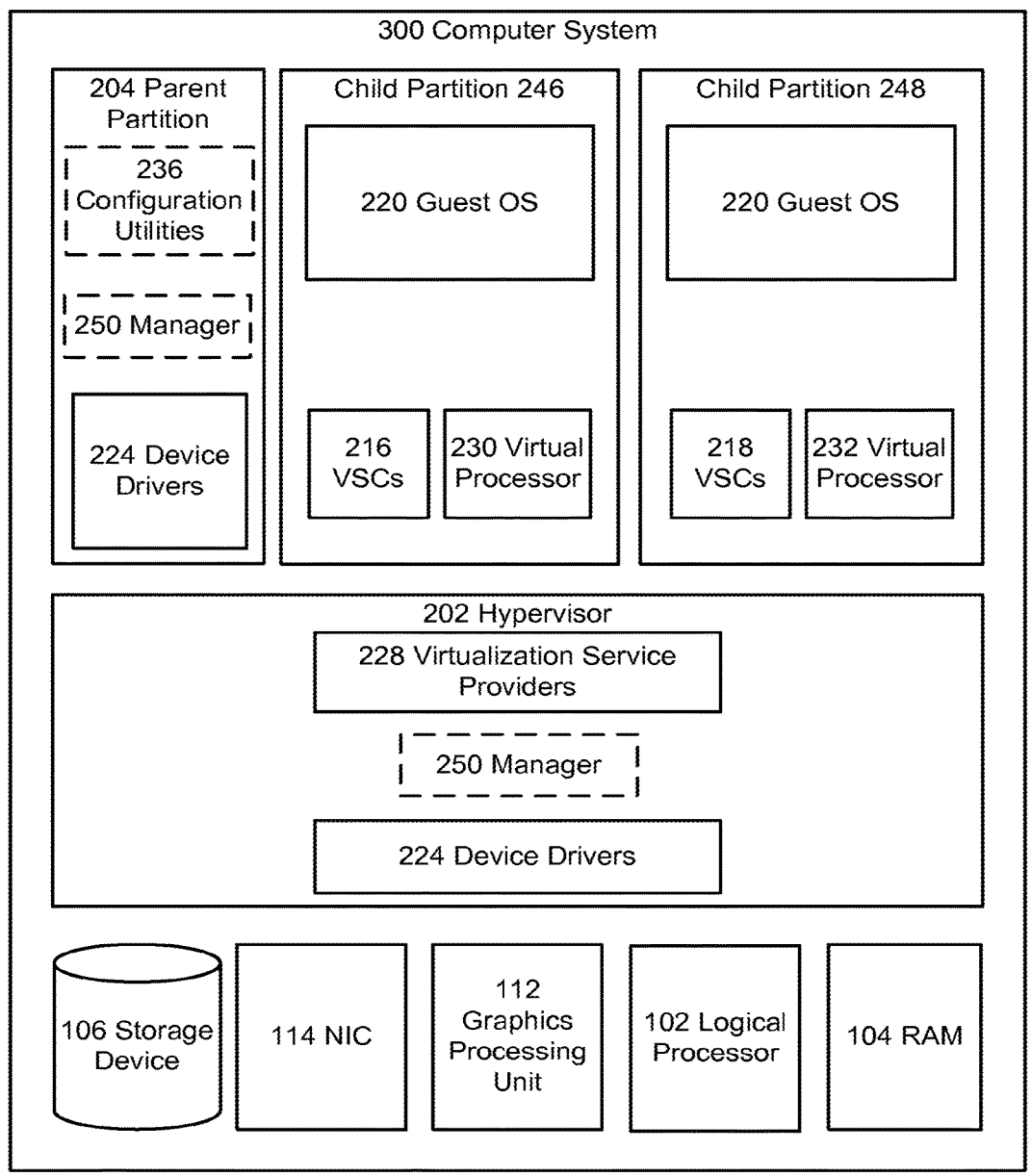
FIG. 3 depicts an operational environment for practicing aspects of the present disclosure.

Referring now to FIGS. 2 and 3, they depict high level block diagrams of computer systems 200 and 300 configured to effectuate virtual machines. In example embodiments of the present disclosure computer systems 200 and 300 can include elements described in FIG. 1 and components operable to effectuate virtual machines. Turning to FIG. 2, one such component is a hypervisor 202 that may also be referred to in the art as a virtual machine monitor. The hypervisor 202 in the depicted embodiment can be configured to control and arbitrate access to the hardware of computer system 100. Broadly, the hypervisor 202 can generate execution environments called partitions, e.g., virtual machines. In embodiments a child partition can be considered the basic unit of isolation supported by the hypervisor 202. That is, each child partition (246 and 248) can be mapped to a set of hardware resources, e.g., memory, devices, logical processor cycles, etc., that is under control of the hypervisor 202 and/or the parent partition and hypervisor 202 can isolate processes in one partition from accessing another partition's resources, e.g., a guest operating system in one partition may be isolated from the memory of another partition. In embodiments the hypervisor 202 can be a stand-alone software product, a part of an operating system, embedded within firmware of the motherboard, specialized integrated circuits, or a combination thereof.

In the depicted example the computer system 100 includes a parent partition 204 that can be also thought of as similar to domain 0 in the open source community. Parent partition 204 can be configured to provide resources to guest operating systems executing in the child partitions by using virtualization service providers 228 (VSPs) that are typically referred to as back-end drivers in the open source community. In this example architecture the parent partition 204 can gate access to the underlying hardware. Broadly, the VSPs 228 can be used to multiplex the interfaces to the hardware resources by way of virtualization service clients (VSCs) (typically referred to as front-end drivers in the open source community). Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one child partition may have a virtual processor having characteristics of an Intel x86 processor, whereas another virtual processor may have the characteristics of a PowerPC processor. The virtual processors in this example can be mapped to logical processors of the computer system such that virtual processor execution of instructions is backed by logical processors. Thus, in these example embodiments, multiple virtual processors can be simultaneously executing while, for example, another logical processor is executing hypervisor instructions. The combination of virtual processors, various VSCs, and memory in a partition can be considered a virtual machine.

Guest operating systems 220 through 222 can include any operating system such as, for example, operating systems from Microsoft®, Apple®, the open source community, etc. The guest operating systems can use user/kernel modes of operation and can have kernels that can include schedulers, memory managers, etc. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Referring now to FIG. 3, it illustrates an alternative architecture to that described above in FIG. 2. FIG. 3 depicts similar components to those of FIG. 2; however in this example embodiment the hypervisor 202 can include the virtualization service providers 228 and device drivers 224, and parent partition 204 may contain configuration utilities 236. In this architecture hypervisor 202 can perform the same or similar functions as hypervisor 202 of FIG. 2. Hypervisor 202 of FIG. 3 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

In embodiments of the present disclosure a network adapter conforming to the "Single Root Input/Output Virtualization specification" Revision 1.0 herein expressly incorporated by reference in its entirety can be installed in computer systems such as those described in the figures. An example adapter could be the "Gigabit ET Dual Port Server Adapter" from Intel®. SR-IOV capable network devices are hardware devices that can share an I/O adapter between, for example, virtual machines, or any other process by virtualizing the interface to a physical function. Each virtualized interface, also known as a virtual function (VF), roughly appears as a separate network interface card on a PCI-express bus of a computer system. For example, each virtual function can have an emulated PCI configuration space and a unique network identifier, e.g., a media access control address (MAC address), world wide name, etc. Thus, each virtual function can support a uniquely addressed and strongly partitioned separate path for accessing a physical function.

Figure 4:
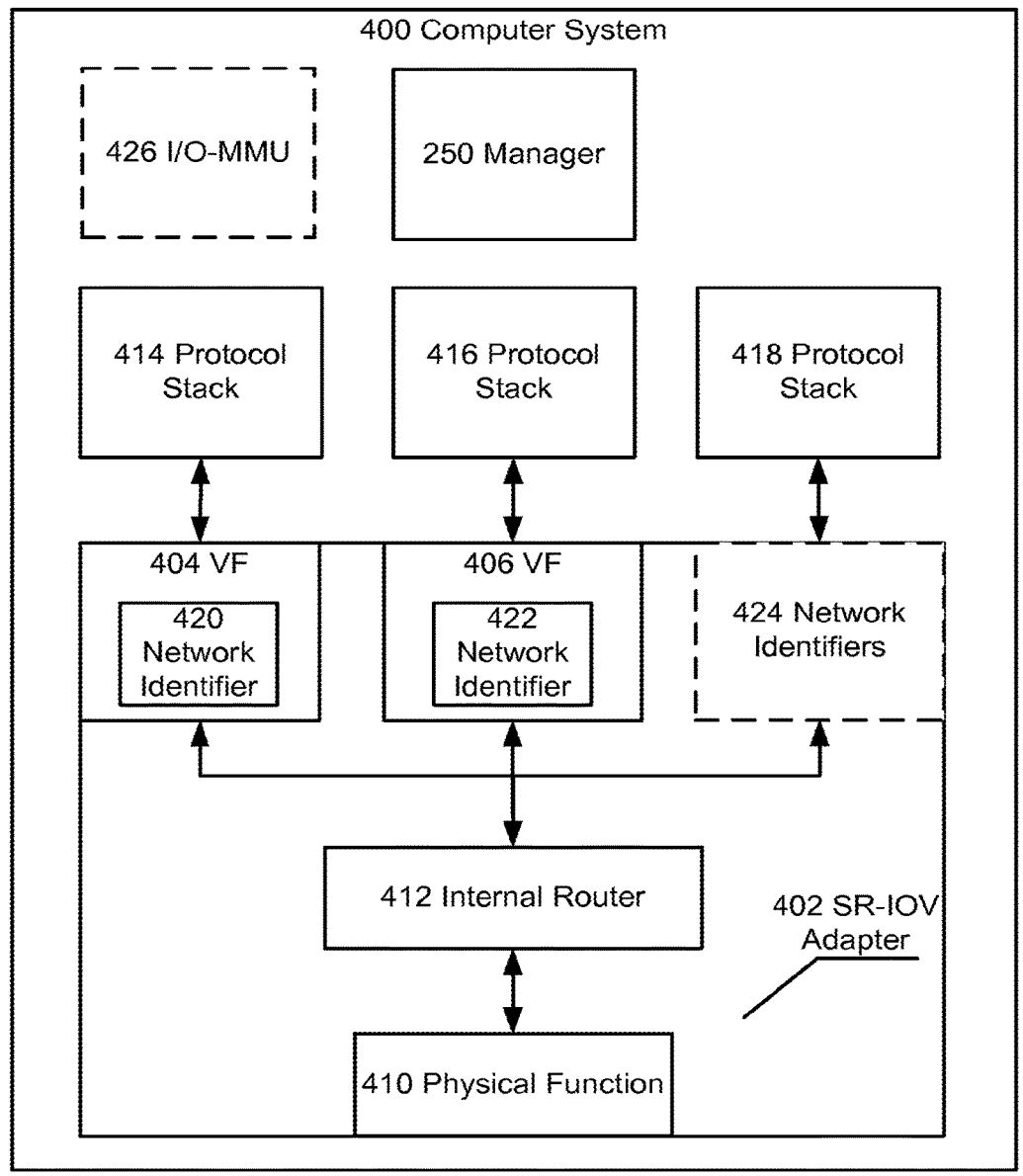
FIG. 4 illustrates a computer system including a SR-IOV compliant network device.

Turning to FIG. 4, it illustrates a computer system 400 that includes an SR-IOV compliant adapter 402 ("adapter"). Similar to that stated above, computer system 400 can include components similar to those above with respect to FIG. 1-3. The adaptor 402 can include a physical function 410 which can correspond to port, which can be connected to a network and an internal router 412. Internal router 412 can be configured to route data to and from network identifiers 420-424 of adapter 402 such as those assigned to virtual functions 404 or 406, e.g., virtual adapters each with a virtual port.

In an example embodiment network adapter 402 can be an Ethernet adapter and the virtual function can be a virtual Ethernet adapter. In this example the virtual function's unique identifier would be an Ethernet MAC address. In a Fibre channel example, adapter 402 can be a fibre channel host bus adapter and a virtual function can be a virtual fibre channel host bus adapter having a world wide name including a world wide node name and a world wide port name. In an Infiniband example the virtual function can be a virtual Infiniband endpoint having a global identifier.

Network identifier 424 is shown in dashed lines which indicate that certain network adapters such as fibre channel host bus adapters or Ethernet adapters can allow multiple unique identifiers to share a single physical port. In fibre channel this ability is called N_Port ID virtualization or NPIV and in Ethernet an adapter can operate in what is called promiscuous mode, include an embedded virtual switch, or filter and route data addressed for specific MAC addresses to separate memory buffers.

Each network identifier can be associated with a software protocol stack (414-418) that is configured to format information so that it can be sent over the network. In a specific TCP/IP example a process can bind to an instance of the TCP/IP stack's application layer through an application layer port. Eventually information that is processed by different functions of the protocol stack can be processed by a group of functions that reside in what is known as the media access control layer which is in charge of assembling frames of data that can be sent over the fabric. This layer of the protocol stack adds the media access control address for the virtual function to frames that are sent out on the network. The protocol stack then passes the assembled frames to the physical layer which is configured to convert the information in the frame into electrical signals and send the frames out to a network.

An input/output memory management unit 426 (I/O-MMU) can be used to couple an I/O interconnect that can perform direct memory access operations, such as a PCI-express interconnect, to RAM. In an embodiment of the present disclosure I/O-MMU 426 can include page tables from hypervisor 202 that translate guest physical addresses from partitions to system physical addresses. I/O-MMU 426 is shown in dashed lines which indicate that it can exist in multiple locations in the computer system 400. For example, the I/O-MMU can be a chip on a motherboard or a component of a logical processor.

Figure 5:
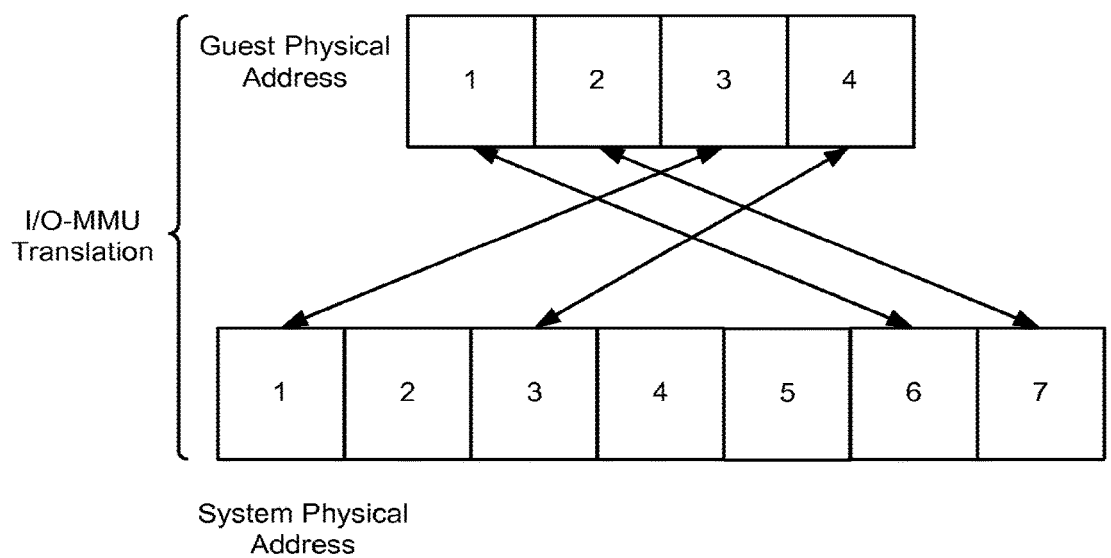
FIG. 5 illustrates a relationship between memory in a virtualized environment.

FIG. 5 illustrates the relationship between guest physical addresses and system physical addresses in an embodiment of the present disclosure. Guest memory is a view of memory that is controlled by hypervisor 202. Guest memory can be assigned to guest operating systems and controlled by their memory managers. The guest physical address can be backed by system physical address (SPA), e.g., the memory of the physical computer system, managed by hypervisor 202. As shown by the figure, in an embodiment the GPAs and SPAs can be arranged into memory blocks, e.g., one or more pages of memory. The relationship between the GPAs and the SPAs can be maintained by shadow page tables such as those described in commonly assigned U.S. patent application Ser. No. 11/128,665 entitled "Enhanced Shadow Page Table Algorithms," the contents of which are herein incorporated by reference in its entirety. In operation, when a guest operating system stores data in GPA block 1, the data can actually be stored in a different SPA such as block 6 on the system. In an embodiment of the present disclosure I/O-MMU 426 can perform translations during I/O operations to move storage data directly from one GPA space to another GPA space. In this embodiment logical processor cycles can be saved by not having to run in the hypervisor instructions to effectuate these translations.

Figure 6:
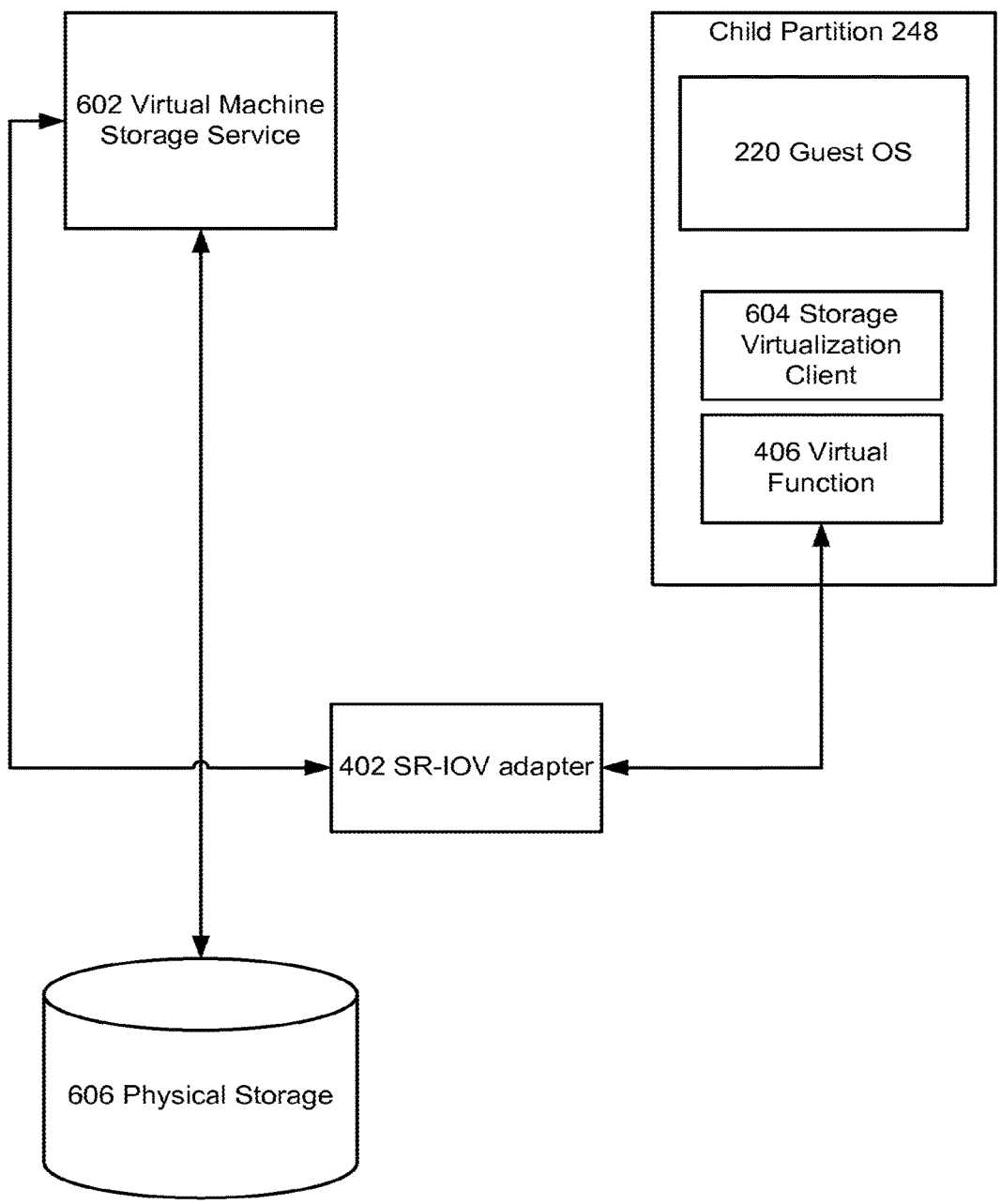
FIG. 6 depicts an embodiment of the present disclosure.

FIG. 6 illustrates a high-level operational environment for describing virtual storage target offloading techniques. FIG. 6 shows a virtual machine storage service 602 in communication with a storage virtualization client 604 via a SR-IOV network adapter 402 and its virtual function 406. As shown by the figure, in this embodiment of the present disclosure SR-IOV network adapter 402 can be used to transport I/O between virtual machines and virtual machine storage services by bypassing software communication paths. This in turn reduces the amount of CPU cycles used to perform I/O for a virtual machine, increases the ability to migrate the storage service 602, and potentially reduces the burden on a host operating system executing in a parent partition and/or the burden on hypervisor 202.

Virtual machine storage service 602 can be configured to communicate with physical storage devices such as logical unit numbers (LUNs) provided by SANs, e.g., dirks that may already be virtualized by other storage virtualization techniques, on behalf of child partitions. In one instance this can include configuring virtual machine storage service 602 to receive I/O requests from virtual machines and route them to LUNs. In another instance, where LUNs are sub-allocated, virtual machine storage service 602 can be configured to generate virtual hard drives; expose them to virtual machines; and store them as virtual hard drive (VHD) files on LUNs or on physical drives. A VHD file represents a virtual machine hard disk that can be encapsulated within a single file. Virtual machine storage service 602 can parse the file and effectuate a disk that can be exposed to guest operating system 220 as if it were physical storage. The virtual hard disks generated by virtual machine storage service 602 can be represented to a bus that is accessible to the guest operating systems in a way that appears like they are local.

In an embodiment of the present disclosure virtual machine storage service 602 can be configured to be a storage target such as a Fibre channel target or an internet small computer system interface (iSCSI) target in the network by attaching a unique network identifier to virtual machine storage service 602 and for example, configuring storage target parameters used to advertise virtual machine storage service 602 as a storage target in a datacenter. In an iSCSI example environment, virtual machine storage service 602 can implement an iSCSI target by effectuating LUNs that are accessible to child partitions over an Internet protocol. Virtual machine storage client 604 or a guest operating system can obtain the address of virtual machine storage service 602 and a connection that emulates a connection to a SCSI hard disk can be setup. Virtual machine storage client 604 can treat virtual machine storage service 602 the same way as it would a SCSI or hard drive and virtual machine storage service 602 can serve up virtual hard drives to child partitions. In this example, virtual machine storage client 604 can create and manage file systems directly on virtual disks provided by the virtual machine storage service 602 without having to mount remote directories as would be done in a networked file system environment. From the viewpoint of guest OS 220, it has a network adapter coupled to a network which is coupled to one or more logical units which act in a manner similar to hard drives.

Figure 7:
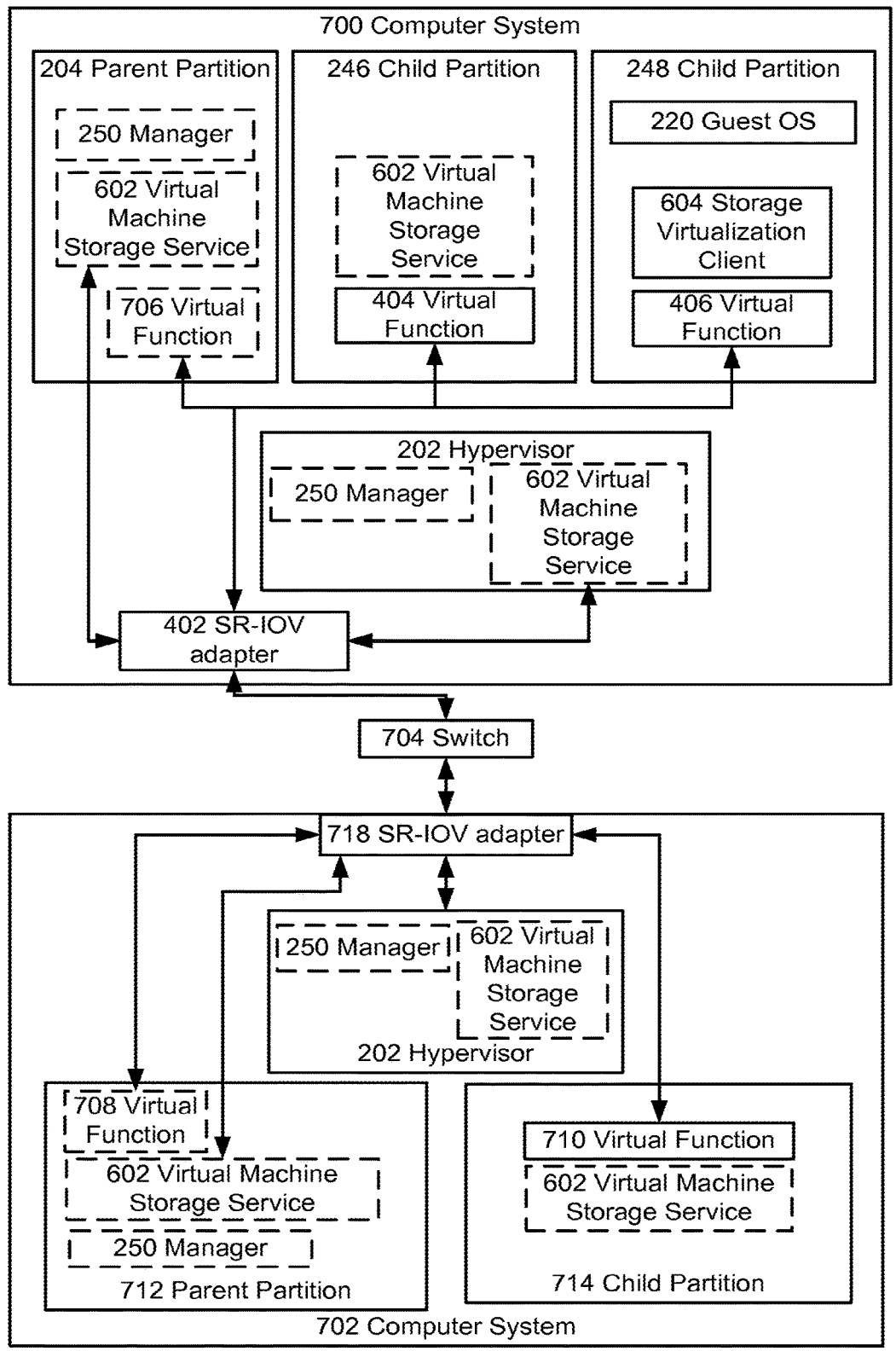
FIG. 7 depicts an operational environment for illustrating aspects of the present disclosure.

FIG. 7 illustrates an example operational environment for practicing aspects of the present disclosure. Similar to FIG. 6, one or more SR-IOV network adapters can be used to transport I/O between virtual machines and virtual machine storage services thereby eliminating the need to send I/O using software communication paths. This reduces the amount of CPU cycles used to perform I/O for a virtual machine, increases the ability to migrate the storage service 602, and potentially reduces the burden on a host operating system and/or the burden on hypervisor 202.

In this example environment a datacenter including two computer systems 700 and 702 is illustrated connected to a switch 704 (while two computer systems are shown one of skill in the art can appreciate that the datacenter may have many more computer systems). Computer systems 700 and 702 can have components similar to those described in FIGS. 1-4 and switch 704 could be an entire infrastructure of interconnected switches and routers. Furthermore, computer systems 700 and 702 are illustrated as including certain features to more clearly explain the herein disclosed techniques and the disclosure is not limited to being implemented in the depicted topology.

Computer system 700 can include manager 250 configured to migrate storage service 602 according to herein described techniques thus virtual machine storage service 602 is illustrated in dashed lines to indicate that it can be migrated from one partition to another partition in the same or a different computer system. Virtual function 706 and 708 are shown in dashed lines to indicate that in certain embodiments the virtual machine storage service 602 can directly interface with the SR-IOV adapter 402 without having to access it via a virtual function. In this example embodiment parent partitions 204 and 712 may have control of the physical hardware and a virtual function would not be needed.

Continuing with the general overview of the figure, virtual machine storage service 602 can be migrated in embodiments of the present disclosure by extracting the unique identifier assigned to it and moving the identifier to a different partition along with any necessary state information. In one instance this process could include extracting, by a logical processor running manager 250, the unique identifier; instructing, by a logical processor running manager 250, an adapter (402 or 718) to attach the unique identifier to a virtual function in a different partition; and instructing, by a logical processor running manager 250, an instance of virtual machine storage service 602 to attach itself to the virtual function. In another instance this process could include extracting, by a logical processor running manager 250, the unique identifier; instructing, by a logical processor running manager 250, an adapter (402 or 718) to attach the unique identifier to the adapter (402 or 718); and instructing, by a logical processor running manager 250, an instance of virtual machine storage service 602 instantiated in a different partition to use the unique identifier to communicate on the fabric.

The following are a series of flowcharts depicting operational procedures. For ease of understanding, the flowcharts are organized such that the initial flowcharts present implementations via an overall "big picture" viewpoint and subsequent flowcharts provide further additions and/or details. Furthermore, one of skill in the art can appreciate that the operations depicted by dashed lines are considered optional.

Figure 8:
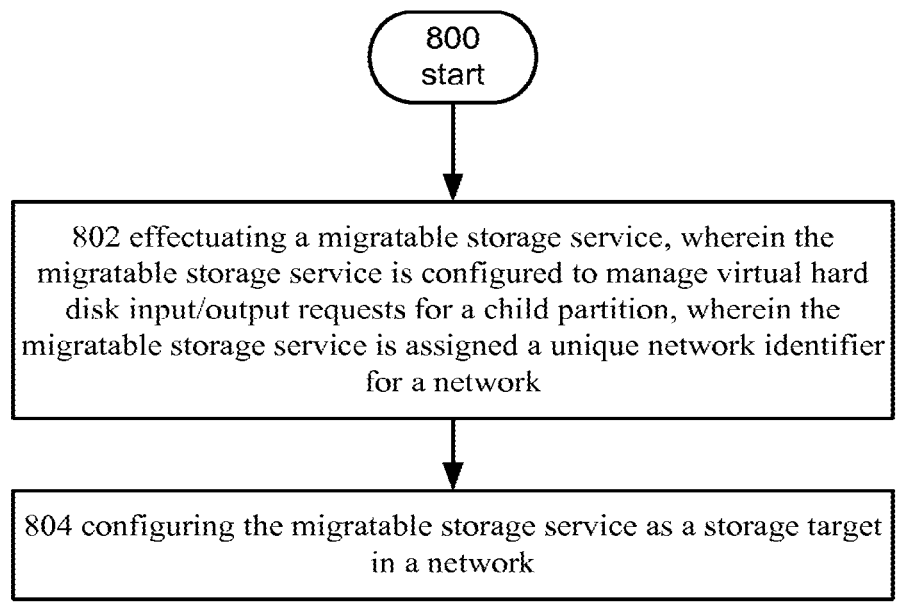
FIG. 8 depicts operational procedure for practicing aspects of the present disclosure.

Referring now to FIG. 8, it illustrates an operational procedure for practicing aspects of the present disclosure. As shown by the figure, operation 800 begins the operational procedure and operation 802 shows effectuating a migratable storage service, wherein the migratable storage service is configured to manage virtual hard disk input/output requests for a child partition, wherein the migratable storage service is assigned a unique network identifier for a network.

For example, and turning to FIG. 6, a migratable storage service such as virtual machine storage service 602 can be effectuated by a computer system. That is, instructions indicative of virtual machine storage service 602 can be executed by a logical processor. Virtual machine storage service 602 is considered migratable because it is attached to a unique network identifier and can be moved by itself, i.e., without moving other management modules, from one partition to another.

In an example embodiment virtual machine storage service 602 can exclusively use the unique identifier on the network, e.g., it may be the only process that communicates using the unique network address in the datacenter. In this example virtual machine storage service 602 can be configured to serialize its own state so that the state information can be sent to a different partition and used to configure another instance of virtual machine storage service 602. In another example embodiment the virtual machine storage service 602 can run in a virtual machine that is attached to a virtual function. In this example the virtual machine storage service 602 may also exclusively communicate in the network using the unique identifier. Migrating the virtual machine storage service 602 can include serializing the state of the virtual machine that includes the virtual machine storage service 602 and sending it to another partition.

In a specific example, and turning to FIG. 7, virtual machine storage service 602 can be migrated from parent partition 204 to child partition 246. In this specific example, a logical processor can run manager 250, i.e., a logical processor can run instructions indicative of the manager 250, and extract the unique identifier used by virtual machine storage service 602 to communicate in the datacenter. The unique identifier can then be sent to child partition 246 and an instance of the virtual machine storage service 602 can be started. Routing tables in adapter 402 can be updated and I/O requests can be routed by adapter 402 to child partition 246 instead of parent partition 204. In this example child partition 246 can be configured to use the unique identifier in addition to any other unique identifiers already in use.

Continuing with the description of FIG. 8, operation 804 shows configuring the migratable storage service as a storage target in a network. For example, in an embodiment of the present disclosure virtual machine storage service 602 can be configured to be a storage target in the datacenter. Similar to that described above, virtual machine storage service 602 can be attached to the unique network identifier in a network and detected as a storage target by a guest OS 220. A communication session can be opened between guest OS 220 and virtual machine storage service 602 and guest OS 220 can detect virtual hard drive(s) exposed by virtual machine storage service 602 and use the virtual disks as if they were local hard drives. In a specific example virtual machine storage service 602 could emulate an iSCSI target as described above. In this example virtual machine storage service 602 can expose virtual disks instead of physical disks and handle I/O from virtual machines by reading or writing to LUNs or physical disks.

Figure 9:
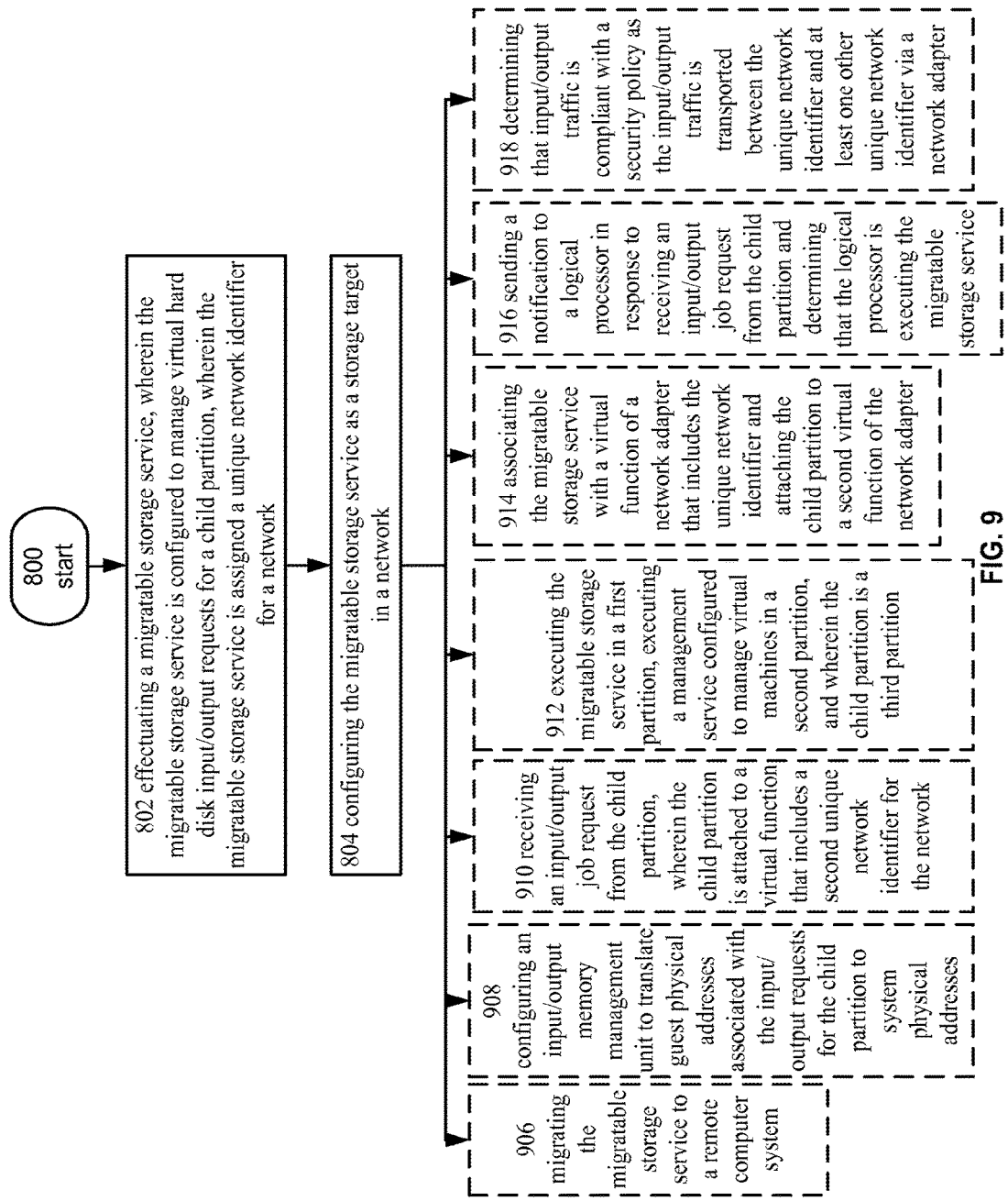
FIG. 9 depicts an alternative embodiment of the operational procedure of FIG. 8.

Turning to FIG. 9, it illustrates an alternative embodiment of the operational procedure of FIG. 8. Operation 906 shows migrating the migratable storage service to a remote computer system. For example, and turning to FIG. 6, in an embodiment the migratable storage service, e.g., virtual machine storage service 602, can be migrated to a remote computer system in a datacenter. For example, in an embodiment the remote computer system may have more I/O bandwidth available than the computer system currently hosting virtual machine storage service 602 and a decision to move the storage service 602 may be made. In this example a logical processor can run manager 250 and extract the unique identifier that is assigned to storage service 602 and send it to the remote computer. Thereafter manager 250 of remote computer can attach the unique identifier to an instance of storage service 602.

In a specific example, and turning to FIG. 7, virtual machine storage service 602 can be migrated from child partition 246 to parent partition 712. In this specific example manager 250 of computer system 700 can extract the unique identifier attached to virtual machine storage service 602 and send it to computer system 702. Manager 250 of computer system 702 can run on a logical processor and attach the unique identifier to an instance of virtual machine storage service 602 running in parent partition 712. In this example virtual storage service 602 may use the unique identifier when sending/receiving I/O from clients that were serviced by virtual machine storage service 602 in child partition 246 with or without using a virtual function 708.

In this specific example state information for virtual machine storage service 602 and the protocol stack can be sent to computer system 702 so that I/O service can be uninterrupted. For example, enough information to allow manager 250 of computer system 702 to configure a protocol stack to reflect at least a functionally equivalent state of protocol stack of computer system 700 can be sent to computer system 702. State information could include the number of the next packet that is going to be sent, the socket number that is used, the maximum buffer size, the server's port number, the client's port number, etc. State information can also include information such as higher level protocol information. Other examples could be information related to encryption protocols used.

In this example embodiment service to the clients would operate uninterrupted because from the point of view of the client the connection was paused instead of dropped. For example, when virtual machine storage service 602 is migrated the protocol stack can wrap-up the current operations it is performing, e.g., by completing or canceling them, and optionally send a back off message to the protocol bound to a virtual machine storage client 604 requesting that the protocol hold from sending information for a short period of time. When protocol stack on computer system 702 is instantiated it can have an equivalent state as protocol stack on computer system 700 and can communicate on the network with the unique identifier that was previously associated with computer system 700. The newly configured protocol stack on computer system 702 can be configured to optionally send a resume message and the protocol servicing the virtual machine storage client 604 can resume sending I/O. Switch 704 can resolve the routing so that protocol messages are sent to virtual machine storage service 602 on computer system 702.

Continuing with the description of FIG. 9, operation 908 shows configuring an input/output memory management unit to translate guest physical addresses associated with the input/output requests for the child partition to system physical addresses. For example, and referring to FIG. 7, in an embodiment of the present disclosure a input/output memory management unit 426 of computer system 700 can be used to convert guest physical address to system physical addresses. For example, when guest operating system 220 initiates an I/O operation, e.g., a read or write, guest operating system 220 generates a command that involves guest physical addresses that may need to be translated into system physical addresses. In an example embodiment these translations can occur in I/O-MMU 426 instead of the MMU. By offloading the memory translations to I/O-MMU 426 the burden on hypervisor 202 and/or parent partition 204 is reduced. For example, guest OS 220 may issue a read operation that includes a request to read a disk offset into a guest memory address. In this example input/output memory management unit 426 can use a table that maps guest memory addresses of child partition 248 to system addresses and convert the guest memory address into the system address that physically backs the guest memory address the guest wants the read to go into. The virtual machine storage service 602 can receive the request and obtain information the client is requesting and provide a response message including previously requested data. The response can be provided in a buffer specified as a guest memory address, in which case the adapter 402 and I/O-MMU 426 can translate the provided guest memory address into system physical address, and the adapter 402 can then copy the response data from the response buffer into the request buffer to satisfy the client's request.

This technique is similar to a memory-to-memory direct memory access (DMA) operation performed by a peripheral device when the client is on the same physical computer as virtual machine storage service 602. In this example embodiment the I/O operation can be similar to a memory-to-memory DMA operation because the network adapter 402 retrieves the information from one block of system physical address and moves it to another block of system physical address on behalf of the virtual machine storage client 604 or virtual machine storage service 602. A specific example may include a read operation issued by virtual machine storage client 604. In this example virtual machine storage client 604 can issue a read operation that specifies pages of storage data that it wants read into memory pages it controls. In this example the pages of data get copied into pages used by virtual machine storage service 602 to satisfy a request and then copies the data into memory pages specified by the virtual machine storage client 604.

Continuing with the description of FIG. 9, operation 910 shows receiving an input/output job request from the child partition, wherein the child partition is attached to a virtual function that includes a second unique network identifier for the network. For example, as shown by FIG. 6, in an embodiment child partition 248 can include virtual function 406. In this example child partition 248 can exclusively interface to SR-IOV adapter 402 via virtual function 406 and can send an I/O request. Adapter 402 can determine that the command is addressed to the unique identifier associated with virtual machine storage service 602 and can send the command to it. In this case an I/O command from child partition 248 can be sent to the virtual machine storage service 602 without having the request sent through hypervisor 202 or through a partition-to-partition communication interface. Further, the adapter 402 can use the unique identifiers of the client 604 and virtual machine storage service 602 in determining which memory pages to use as buffers, and hence, which address spaces to copy data between.

In a specific example the I/O request can be a write operation specifying the location of the data (in guest physical addresses) and the location on the virtual hard drive that the data should be written. In this example storage virtualization client 604 can place the request in one or more packets of information addressed to unique identifier of virtual machine storage service 602. In this example adapter 402 can receive the request and send it to virtual machine storage service 602. Adapter 402 can additionally move the data from child partition guest physical addresses to system physical addresses allocated to virtual machine storage service 602. That is, adapter 402 and I/O MMU 426 can be configured to translate both the sending and receiving buffers from guest physical addresses to system physical addresses and the adapter 402 can then copy the data from an internal sending buffer to the receiving buffer internally in terms of system physical addresses. Virtual machine storage service 602 can then store the data in an appropriate location consistent with its virtual hard drive implementation. As one of skill in the art can appreciate, this may involve using a virtual hard drive file, it may involve storing data on a LUN, or it may involve other techniques and locations for storing data, possibly redundantly.

Continuing with the description of FIG. 9, operation 912 shows executing the migratable storage service in a first partition, executing a management service configured to manage virtual machines in a second partition, and wherein the child partition is a third partition. For example, in an embodiment virtual machine storage service 602 can execute in a first partition such as child partition 246, parent partition 204 can run a management service, and virtual machine storage client 604 can run in partition 248. In this example embodiment virtual machine storage service 602 is in a separate partition from management processes. In this configuration child partition 246 may effectively act like a dedicated storage partition acting like a SAN target. This configuration can reduce the burden on hypervisor 202 and the parent partition. For example, by separating the storage service from a parent partition intra-operating system locking may be reduced. Moreover, by configuring a computer system in this manner the burden on the hypervisor scheduler is reduced by reducing the number of messages that need to be sent between partitions.

Continuing with the description of FIG. 9, operation 914 shows associating the migratable storage service with a virtual function of a network adapter that includes the unique network identifier and attaching the child partition to a second virtual function of the network adapter. For example, and turning to FIG. 7, in an embodiment virtual machine storage service 602 can be associated with a virtual function such as virtual function 404. In the instance where virtual machine storage service 602 runs in child partition 246 virtual function 404 can be used so it accesses adapter 402 in a controlled manner, i.e., in a way that ensures that any processes in child partition 246 do not access data that is outside of its partition. In addition, a virtual machine snapshot operation could be used to migrate virtual machine storage service 602.

Continuing with the description of FIG. 9, operation 916 shows sending a notification to a logical processor in response to receiving an input/output job request from the child partition and determining that the logical processor is executing the migratable storage service. For example, in an embodiment when an I/O job needs software processing hypervisor 202 can receive an interrupt and run. Hypervisor 202 can identify a logical processor that is running or is scheduled to run virtual machine storage service 602 and can notify that logical processor, i.e., by sending an interrupt or a lightweight notification. If virtual machine storage service 602 is situated in a child partition the interrupt can be sent to a logical processor without having to wake up a management partition to service the message. If virtual machine storage service 602 is currently executing a context switch to virtual machine storage service 602 would not have to occur nor would an interrupt, as a lightweight notification could be used instead.

Continuing with the description of FIG. 9, operation 918 shows determining that input/output traffic is compliant with a security policy as the input/output traffic is transported between the unique network identifier and at least one other unique network identifier via a network adapter. For example, in an embodiment adapter 402 can include a security policy for network traffic. In this example embodiment adapter 402 can be configured to determine that input/output traffic sent between virtual machine storage service 602 and another unique identifier, e.g., one that is attached to a virtual machine, conforms to the security policy. In a specific example a security policy may require that all input/output traffic is encrypted. In this example adapter 402 can be configured to determine if writes to the virtual hard drive are in clear text or are encrypted. In another example, a security policy may require that virtual local area networks are kept entirely separate, with no data traffic allowed between endpoints in different virtual local area networks.

Figure 10:
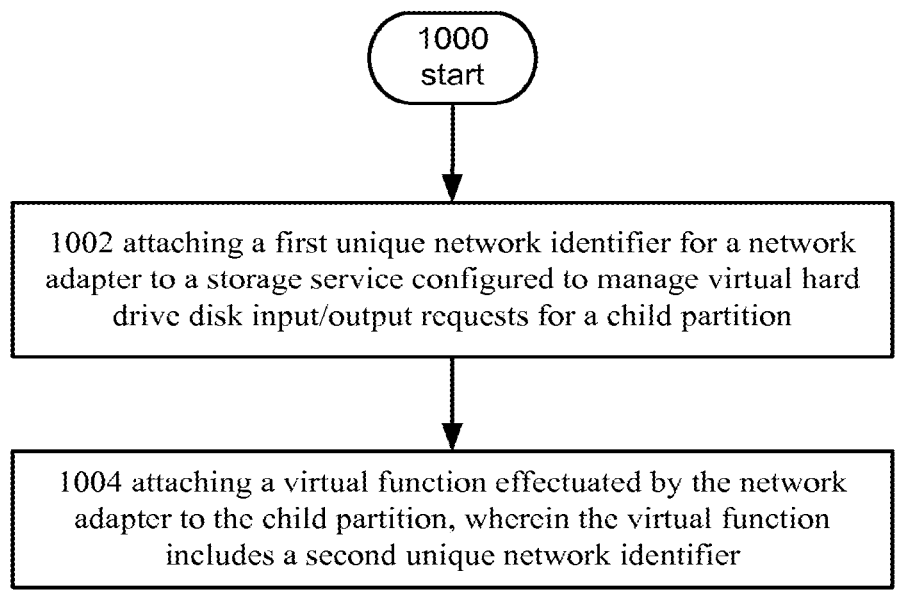
FIG. 10 depicts operational procedure for practicing aspects of the present disclosure.

Turning now to FIG. 10, it illustrates an operational procedure for practicing aspects of the present disclosure including operations 1000, 1002, and 1004. Operation 1000 begins the operational procedure and operation 1002 shows attaching a first unique network identifier for a network adapter to a storage service configured to manage virtual hard drive disk input/output requests for a child partition. For example, and turning to FIG. 6, in an embodiment of the present disclosure SR-IOV adapter 402 can effectuate multiple network identifiers and assign one of them to virtual machine storage service 602. In a fibre channel example, a fibre channel host bus adapter can use N_Port ID virtualization or (NPIV) to allow multiple unique identifiers to be used on the same port. In this fibre channel example virtual machine storage service 602 could exclusively use the assigned NPIV address to communicate on the fabric.

Continuing with the description of FIG. 10, operation 1004 shows attaching a virtual function effectuated by the network adapter to the child partition, wherein the virtual function includes a second unique network identifier. For example, and referring again to FIG. 6, SR-IOV adapter 402 can instantiate virtual function 406 including a unique network identifier and attach it to a virtual machine. In this example embodiment adapter 402 is configured to function as a switch that routes I/O requests through the adapter to the storage service 602 bypassing hypervisor 202 or a separate partition-to-partition communication mechanism. This in turn reduces the time used executing instructions on a logical processor to notify and switch partitions.

Figure 11:
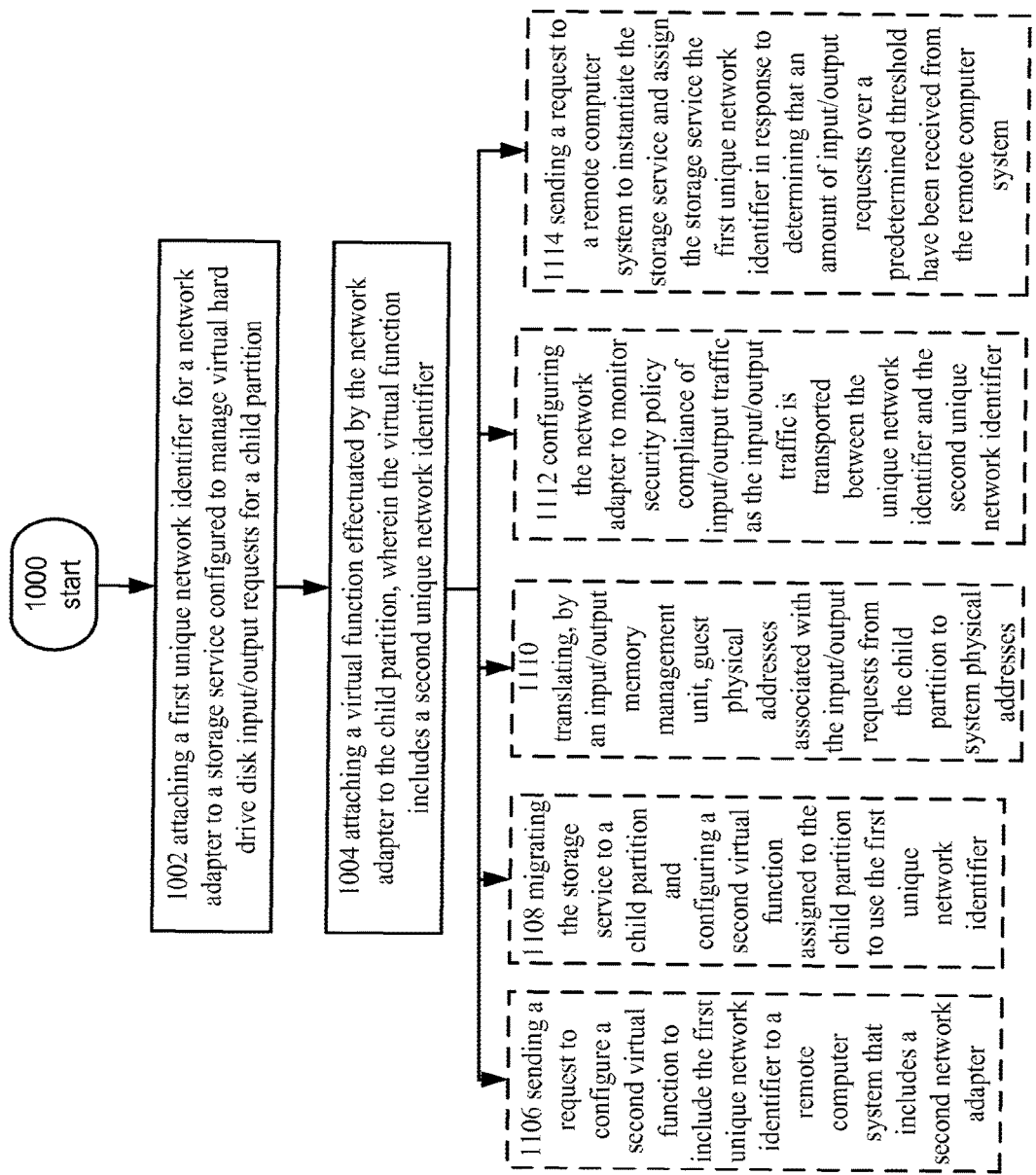
FIG. 11 depicts an alternative embodiment of the operational procedure of FIG. 10.

Turning now to FIG. 11, it illustrates an alternative embodiment of the operational procedure of FIG. 10 including additional operations 1106, 1108, 1110, 1112, and 1114. Operation 1106 shows sending a request to configure a second virtual function to include the first unique network identifier to a remote computer system that includes a second network adapter. For example, in an embodiment a logical processor can be executing instructions in manager 250 and can generate a request to configure a virtual function in a remote computer system that has another adapter to include the unique network identifier attached to virtual machine storage service 602. Turning to FIG. 7, in a specific example manager 250 on computer system 700 can send the generated request to computer system 702 having an adapter 718. The request in this example can be used by manager 250 in computer system 702 to command it to instantiate virtual function 710 and have it include the unique identifier associated with an instance of virtual machine storage service 602.

Continuing with the description of FIG. 11, operation 1108 shows migrating the storage service to a child partition and configuring a second virtual function assigned to the child partition to use the first unique network identifier. For example and turning to FIG. 7, a logical processor can run manager 250 and migrate virtual machine storage service 602 from, for example, parent partition 204 to child partition 246. In this example logical processor can run manager 250 and extract the unique identifier that is associated with virtual machine storage service 602 and send it to adapter 402. Adapter 402 can instantiate virtual function 404 and attach the unique identifier to it. Thereafter manager 250 can attach the unique identifier to an instance of virtual machine storage service 602. In this example embodiment virtual machine storage service 602 is in a separate partition from management processes and has effectively become a dedicated storage partition acting like an iSCSI target.

Turning now to operation 1110 it shows translating, by an input/output memory management unit, guest physical addresses associated with the input/output requests from the child partition to sytem physical addresses. For example, and referring to FIG. 7, in an embodiment of the present disclosure input/output memory management unit 426 of computer system 700 can be used to convert guest physical address to system physical addresses. For example, when guest operating system 220 initiates an I/O operation, e.g., a read or write, guest operating system 220 generates a command that involves guest physical addresses. In this example input/output memory management unit 426 can use a table that maps guest memory addresses of child partition 246 to system addresses used by parent partition 204. Adapter 402 and I/O MMU 426 can be configured to translate both the sending and receiving buffers from guest physical addresses to system physical addresses and adapter 402 can then copy the data from an internal sending buffer to an internal receiving buffer or vice-versa.

Turning now to operation 1112 it shows configuring the network adapter to monitor security policy compliance of input/output traffic as the input/output traffic is transported between the unique network identifier and the second unique network identifier. For example, in an embodiment adapter 402 can include a security policy for network traffic. In this example embodiment adapter 402 can be configured to determine that input/output traffic sent between virtual machine storage service 602 and another unique identifier, e.g., one that is attached to a virtual machine, conforms to the security polity. A specific example may include a security policy that requires that certain virtual machines send I/O using a certain unique identifier in the network. The adapter 402 in this example can monitor packets of information from the virtual machines and determine if they are compliant with the security policy.

Turning now to operation 1114 it shows sending a request to a remote computer system to instantiate the storage service and assign the storage service the first unique identifier in response to determining that an amount of input/output requests over a predetermined threshold have been received from the remote computer system. For example, in an embodiment of the present disclosure a logical processor can run instructions indicative of manager 250 and send a request directing the remote computer system such as computer system 702 to instantiate an instance of the virtual machine storage service 602 and attach it to the unique identifier. The logical processor can generate this request after monitoring the unique identifiers associated with the incoming I/O requests and determining that a number of requests over a threshold have been received from computer system 702. In a specific example the manager 250 could have determined that 60% of I/O requests over the past 30 minutes have been received from unique identifiers currently associated with computer system 702. In this instance manager 250 can determine that performance of the datacenter may be increased if virtual machine storage service 602 is executing locally on computer system 702 and migrate it.

Figure 12:
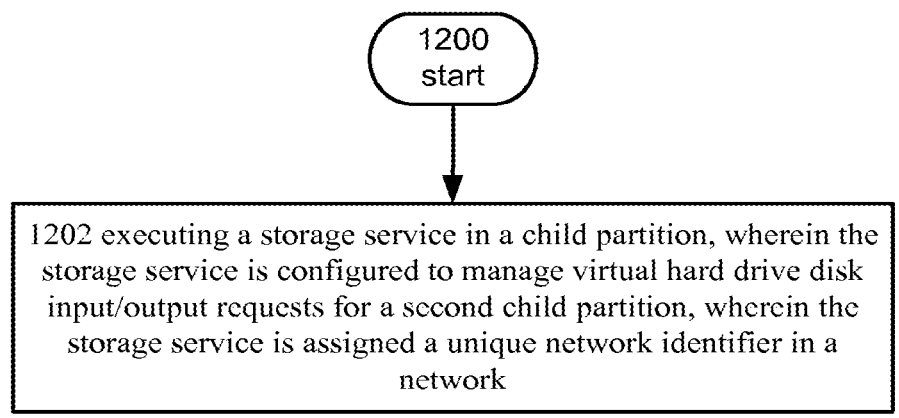
FIG. 12 depicts operational procedure for practicing aspects of the present disclosure.

Turning now to FIG. 12 it illustrates an operational procedure including operations 1200 and 1202. Operation 1200 begins the operational procedure and operation 1202 shows executing a storage service in a child partition, wherein the storage service is configured to manage virtual hard drive disk input/output requests for a second child partition, wherein the storage service is assigned a unique network identifier in a network. For example, in an embodiment virtual machine storage service 602 can be effectuated in a child partition, e.g., child partition 246, and assigned a unique identifier in the network, e.g., a world wide name. Child partition 246 in this example embodiment can be controlled by hypervisor 202 and/or parent partition 204. In this configuration child partition 246 may effectively become a dedicated storage partition acting like an iSCSI target.

Figure 13:
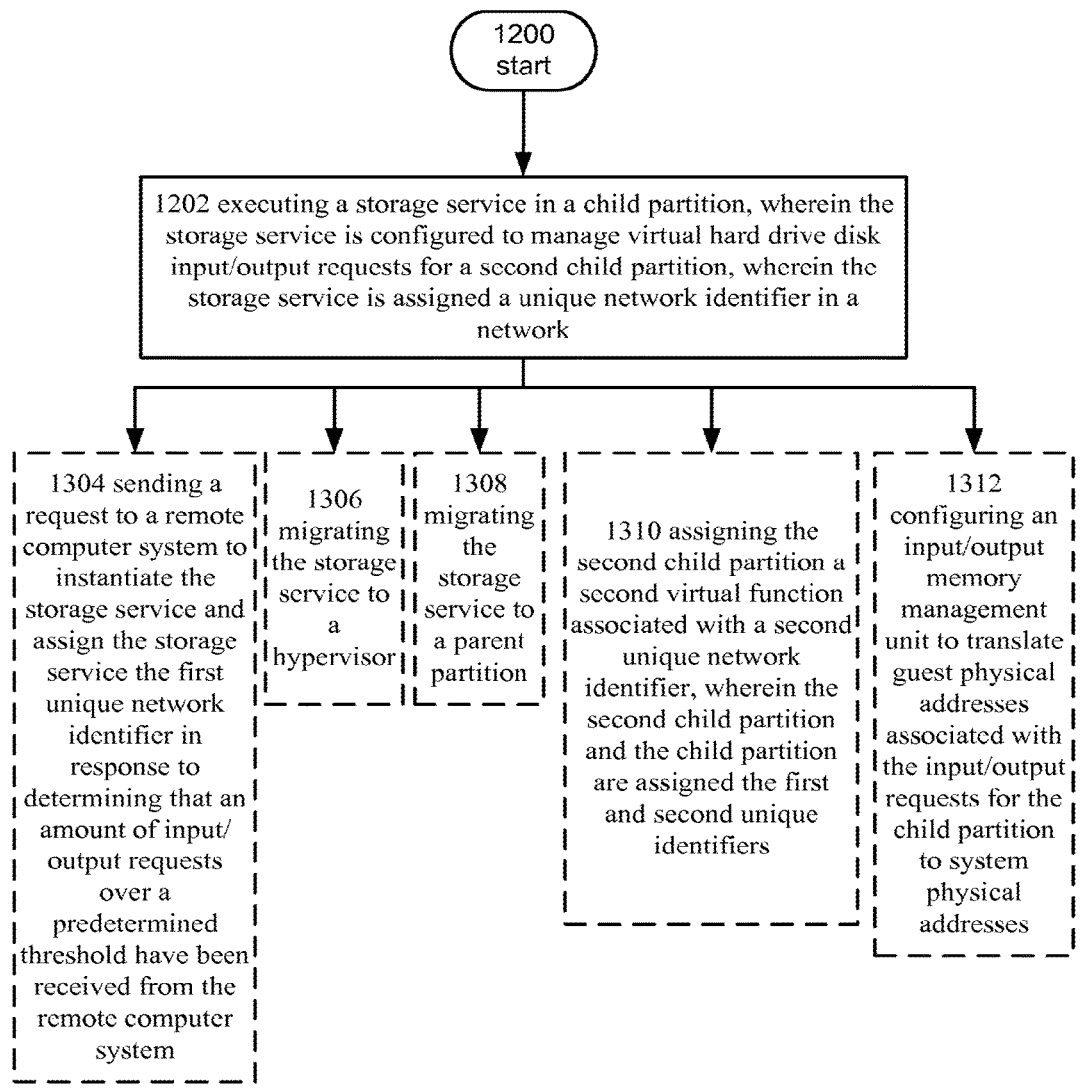
FIG. 13 depicts an alternative embodiment of the operational procedure of FIG. 12.

Turning now to FIG. 13, it illustrates an alternative embodiment of the operational procedure of FIG. 12 including operations 1304, 1306, 1308, 1310, and 1312. Turning to operation 1304 it shows sending a request to a remote computer system to instantiate the storage service and assign the storage service the first unique network identifier in response to determining that an amount of input/output requests over a predetermined threshold have been received from the remote computer system. For example, in an embodiment of the present disclosure a logical processor can run instructions indicative of manager 250 and send a request directing the remote computer system such as computer system 702 to instantiate an instance of the virtual machine storage service 602 and attach it to the unique identifier. The logical processor can generate this request after monitoring the unique identifiers associated with the incoming I/O requests and determining that a number of requests over a threshold have been received from computer system 702. In a specific example the manager 250 could have determined that 60% of I/O requests over the past 30 minutes have been received from unique identifiers currently associated with computer system 702. In this instance manager 250 can determine that performance of the datacenter may be increased if virtual machine storage service 602 is executing locally on computer system 702 and migrate it.

Continuing with the description of FIG. 13, operation 1306 shows migrating the storage service to a hypervisor. For example, and turning to FIG. 7, in an embodiment virtual machine storage service 602 can be migrated to hypervisor 202. In this example embodiment computer system 702 may have an architecture similar to that depicted in FIG. 3 and a decision to move the storage service 602 from child partition 246 to hypervisor 202 can be made. In this example a logical processor can run manager 250 and extract the unique identifier that is associated with virtual machine storage service 602 and hypervisor 202 can attach it to an instance of the virtual machine storage service 602. In an example embodiment since hypervisor 202 controls the hardware it can be configured to access the physical function of adapter 402. In a fibre channel example implementation, a fibre channel host bus controller can use NPIV to use the unique identifier to send/receive I/O commands via adapter 402.

Continuing with the description of FIG. 13, operation 1308 shows migrating the storage service to a parent partition. For example, and turning to FIG. 7, in an embodiment virtual machine storage service 602 can be migrated from child partition 246 to parent partition 204 or 712. In this example a logical processor can run manager 250 and extract the unique identifier that is associated with virtual machine storage service 602 and either send it to a remote computer or to parent partition 204 on the local computer system. Thereafter the unique identifier can be attached to an instance of storage service 602.

Continuing with the description of FIG. 13, operation 1310 shows assigning the second child partition a second virtual function associated with a second unique network identifier, wherein the second child partition and the child partition are assigned the first and second unique identifiers. In this example embodiment virtual function 406 can be attached to child partition 248 and it can have a second unique network identifier on the network. As shown by the figure, in this example embodiment both child partitions 246 and 248 can be attached to the same SR-IOV adapter 402. Thus, in this example embodiment I/O requests can be passed through the SR-IOV adapter 402 instead of via hypervisor 202 or via partition-to-partition communication mechanisms and without having to send the I/O over switch 704.

Continuing with the description of FIG. 13, operation 1312 shows configuring an input/output memory management unit to translate guest physical addresses associated with the input/output requests for the child partition to system physical addresses. For example, and referring to FIG. 7, in an embodiment of the present disclosure input/output memory management unit 426 of computer system 700 can be used to convert guest physical address to system physical addresses. For example, when guest operating system 220 initiates an I/O operation, e.g., a read or write, guest operating system 220 generates a command that involves guest physical addresses. In this example input/output memory management unit 426 can use a table that maps guest memory addresses of child partition 248 to system addresses used by the parent partition. Adapter 402 and I/O MMU 426 can be configured to translate both the sending and receiving buffers from guest physical addresses to system physical addresses and adapter 402 can then copy the data from an internal sending buffer to an internal receiving buffer or vice-versa.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combinations thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A system comprising:
   a processor; and a computing device that comprises a first set of instructions to be performed that when executed by the processor cause the system to:
  receive a first input/output request addressed to a first unique identifier for a network from a child partition; and
  route, via a network adapter, the first input/output request to a storage service attached to the first unique identifier, the storage service configured to serve as a storage target in the network and manage input/output operations for the child partition to an associated virtual hard disk;
  wherein the storage service is attached to a first virtual function including the first unique identifier and the child partition is attached to a second virtual function including a second unique identifier, the first virtual function and the second virtual function being effectuated by the network adapter.

2. The system of claim 1, wherein the computing device further comprises a second set of instructions to be performed that when executed by the processor cause the system to:
  send a request to a remote computing system to instantiate an instance of the storage service and assign the first unique identifier to the instance of the storage service on the remote computing system.

3. The system of claim 2, wherein the computing device further comprises a third set of instructions to be performed that when executed by the processor cause the system to:
  receive a second input/output request addressed to the first unique identifier from the child partition; and
  route, via the network adapter, the second input/output request to the instance of the storage service on the remote computing system.

4. The system of claim 3, wherein the first input/output request is sent in response to determining that a number of input/output requests over a predetermined threshold have been received from the remote computer system.

5. The system of claim 4, wherein the network adapter is configured to transport the input/output operations between the storage service and the child partition without using software communication paths.

6. The system of claim 4, wherein the input/output operations are directly communicated between the child partition and the network adapter without support from a hypervisor.

7. The system of claim 1, wherein the storage service is further configured to generate the virtual hard disk.

8. A method, comprising:
  receiving a request, from a remote computing system, to instantiate a storage service and assign a first unique identifier for a network to the storage service, the storage service configured to serve as a storage target in the network and manage input/output operations for a child partition to an associated virtual hard disk, the virtual hard disk and the child partition each associated with computing resources of the remote computing system; and
  instantiating the storage service without migrating the virtual hard disk, wherein the storage service is assigned the first unique identifier;
  wherein the storage service is attached to a first virtual function including the first unique identifier and the child partition is attached to a second virtual function including a second unique identifier, the first virtual function and the second virtual function being effectuated by a network adapter.

9. The method of claim 8, further comprising:
  receiving an input/output request addressed to the unique identifier from the child partition associated with the computing resources of the remote computing system.

10. The method of claim 8, wherein the storage service exchanges data with the virtual hard disk associated with the computing resources of the remote computing system to satisfy the input/output request.

11. The method of claim 8, wherein instantiating the storage service includes instantiating the storage service in a parent partition.

12. The method of claim 8, further comprising:
  receiving state information of a protocol stack associated the storage service from the remote computing system.

13. The method of claim 8, wherein instantiating the storage service includes updating a routing table in the network adapter.

14. The method of claim 13, wherein the state information is used in instantiating the storage service to provide the child partition with uninterrupted input/output service during migration.

15. The method of claim 13, wherein serialization is performed by an instance of the storage service executing on the remote computing system to generate the state information.

16. A computing system comprising:
  a processor; and
  a computing device that comprises a first set of instructions to be performed that when executed by the processor cause the system to at least:
    send a request to a remote computing system to instantiate a storage service and assign a first unique identifier for a network to the storage service, the storage service configured to serve as a storage target in the network and manage input/output operations for a child partition to an associated virtual hard disk, the child partition and the virtual hard disk each effectuated with computing resources of the computing system; and
    send an input/output request from the child partition to the remote computing system that is addressed to the first unique identifier;
    wherein the storage service is attached to a first virtual function including the first unique identifier and the child partition is attached to a second virtual function including a second unique identifier, the first virtual function and the second virtual function being effectuated by a network adapter.

17. The system of claim 16, wherein the computing device further comprises a second set of instructions to be performed that when executed by the processor cause the system to:
  receive data from the storage service at the remote computing system in response to the input/output request.

18. The system of claim 16, wherein the data is received from the storage service instantiated in a hypervisor of the remote computing system.

19. The system of claim 16, wherein an input/output memory management unit translates guest physical addresses associated with the input/output request from the child partition to system physical addresses.

* * * * *